(12) United States Patent
Grinevich et al.

(10) Patent No.: US 6,433,035 B1
(45) Date of Patent: Aug. 13, 2002

(54) SELECTIVELY COLORABLE POLYMERIZABLE COMPOSITIONS

(75) Inventors: Oleg V. Grinevich, Bowling Green; Douglas C. Neckers, Perrysburg, both of OH (US)

(73) Assignee: Spectra Group Limited, Inc., Maumee, OH (US)

( * ) Notice: Subject to any disclaimer, the term of this patent is extended or adjusted under 35 U.S.C. 154(b) by 0 days.

(21) Appl. No.: 09/638,252

(22) Filed: Aug. 14, 2000

(51) Int. Cl.[7] .............................. C08J 3/28; G03C 7/00; G03F 7/027
(52) U.S. Cl. ........................ 522/2; 522/15; 522/25; 522/28; 522/78; 522/148; 522/167; 522/168; 522/170; 522/174; 522/181; 522/182; 430/293; 430/338; 430/339; 430/341; 430/342; 430/344
(58) Field of Search .................... 522/15, 25, 31, 522/14, 28, 32, 65, 2, 78, 167, 168, 170, 174, 181, 182, 148; 430/293, 338, 339, 341, 342, 344

(56) References Cited

U.S. PATENT DOCUMENTS

| | | |
|---|---|---|
| 4,659,649 A | 4/1987 | Dickinson et al. .......... 430/280 |
| 5,028,792 A | 7/1991 | Mullis ..................... 250/474.1 |
| 5,141,842 A | 8/1992 | Mitchell et al. ............. 430/285 |
| 5,441,850 A | 8/1995 | Marshall et al. ............. 430/336 |
| 5,453,345 A | 9/1995 | Grasshoff et al. ........... 430/270 |
| 5,677,107 A | 10/1997 | Neckers ..................... 430/269 |
| 5,942,554 A | 8/1999 | Ren et al. ..................... 522/25 |

FOREIGN PATENT DOCUMENTS

| | | |
|---|---|---|
| WO | 9709168 | 3/1997 |
| WO | 0007071 | 2/2000 |

*Primary Examiner*—Susan W. Berman
(74) *Attorney, Agent, or Firm*—Thompson Hine LLP

(57) ABSTRACT

Selectively colorable compositions and a method for forming selectively colored polymeric bodies using such compositions are disclosed. In accordance with the invention, a selectively colorable polymerizable composition comprising a leucobase color former is irradiated with light of a particular wavelength and specific intensity for a specified duration. Exposure to actinic radiation cures the composition and activates the color former. Exposure to higher dosages of actinic radiation can bleach the composition. The irradiation dosage can be varied to selectively color the polymeric body whereby the resultant color of any particular area depends on the exposure dose received at that location. By varying the dose, a polymeric body can be prepared having distinctly colored elements at specific locations.

21 Claims, No Drawings

SELECTIVELY COLORABLE POLYMERIZABLE COMPOSITIONS

BACKGROUND OF THE INVENTION

The present invention relates to selectively colorable compositions and to a method for forming selectively colored polymeric bodies using such compositions.

Commonly assigned U.S. Pat. No. 5,942,554 discloses a curable composition containing a color precursor and an onium salt which is both cured and colored upon exposure to actinic radiation. Color precursors disclosed as being useful are those which are capable of reacting with acid or whose excited states are capable of donating an election.

Commonly assigned U.S. patent application Ser. No. 09/558,599 filed on Apr. 26, 2000, now U.S. Pat. No. 6,309,797 discloses selectively colorable polymerizable compositions comprising a leucobase color former and a leuconitrile color former. Irradiation of the composition cures and selectively colors the composition. The color at any one location depends on the actinic dose and the interaction of the leucobase and leuconitrile colorformers. In one embodiment, a selectively colorable, polychromic composition is provided wherein low light exposure creates a polymer of one color, intermediate light exposure changes the color of the polymer and a high dosage of light exposure bleaches the color of the polymer.

International Publication Number WO 97/09168 to Zeneca discloses a photocurable, photocolorable composition which is irradiated with a low dose of light to cure and a different dose of light, preferably higher, to cause color formation. Color formation or color change occurs as a result of contact between a colorformer and a photochemically generated developer. The colorformers disclosed as being useful include lactones, fluorans, etc. which are acid sensitive compounds.

A selectively colorable solid object is an object that can be colored at small individual, but specifically defined, sites by irradiating light of a particular wavelength and specific intensity for a specified duration. The light sources capable of producing the selectively colorable solid object include: (a) a laser interfaced with an XY scanner (for polymer films), (b) a laser interfaced with an XYZ scanner (for 3D parts), (c) digital mirror device, (d) UV and Visible lamps with a masking device, etc.

A selectively colorable resin (SCR) system consists of: (a) the matrix (a blend of polymerizable material or a solid polymer), (b) a color former, (c) a color initiator (species that generate other species capable of reacting with color former; may not be needed in some systems); and (d) a chain reaction initiator (radical or cationic or none depending on the system).

The conventional method for forming a colored plastic body is to add a dye or pigment to the liquid prepolymer composition. The composition is then cured with actinic radiation. The latter requires that the absorption spectra of the photoinitiator and the dye/pigment differ. If the dye/pigment absorbs actinic radiation at the same wavelength as the photoinitiator, slower or no cure will be achieved. The color formation method is also not selective. The entire plastic is uniformly colored. Still another problem is that the photopolymerization process requires actinic radiation, but the color forming process requires only that the composition be well mixed. Though one of the processes can be controlled by the intensity/wavelength of the actinic radiation, the other is unaffected by it. Thus there is no selectivity of color formation in the plastic body.

Accordingly, there is a need for selectively colorable polymerizable compositions and for a method of forming selectively colored polymeric bodies using such compositions wherein the colorization process can be controlled as to the location and intensity of the color formed.

SUMMARY OF THE INVENTION

The present invention discloses selectively colorable compositions and a method for forming selectively colored polymeric bodies using such compositions. In accordance with the invention, a selectively colorable polymerizable composition comprising a leucobase color former and an oxidizing agent is irradiated with light of a particular wavelength and specific intensity for a specified duration. Exposure to actinic radiation cures the composition and activates the color former which can be optionally deactivated or bleached by further exposure. The irradiation dosage can be varied to selectively color the polymeric body whereby the resultant color of any particular area depends on the exposure dose received at that location. By varying the dose, a polymeric body can be prepared having distinctly colored elements at specific locations.

It is believed that, upon irradiation of the polymerizable composition of the present invention containing a polymerizable compound, a leucobase color former and an onium salt, two processes occur for color formation and bleaching. One process generates a dye cation via electron transfer process upon exposure of a leucobase dye precursor in the presence of an oxidizing agent and a second process is the bleaching of the dye cation upon further exposure. Accordingly, the composition of the present invention provides a photopolymerizable selectively colorable system. The bleaching process is efficient only when the starting material is an acid non-sensitive leucobase. The initial color is formed by a photooxidation process which involves electron transfer from the leucodye to the oxidizing agent. The bleaching process is not nearly as efficient in the case when the starting material is a dye or an acid-sensitive dye.

Under low dosage, color formation depends primarily on Scheme 1 wherein exposure of a leucobase to light in the presence of a oxidizing agent yields a dye cation. The mechanism is illustrated below for a triarylmethane (TAM) leucobase (TAMH) susceptible to oxidation. Ox represents an oxidizing agent, TAM$^+$ represents the colored species and hv represents exposure to actinic radiation. It is anticipated that the scheme below will also be valid for diarylmethane (DAM) and other photooxidizable leucodyes which do not form the color with acid on contact.

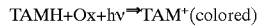
TAMH+Ox+hv→TAM$^+$(colored)　　　　　　　　　　Scheme 1

At higher doses of irradiation, bleaching of TAM$^+$ occurs (Scheme 2). Therefore, the color of the polymeric body at higher doses disappears and the contrast is produced.

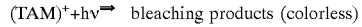
(TAM)$^+$+hv→ bleaching products (colorless)　　　　Scheme 2

In another embodiment of the present invention, the oxidation process can be inhibited significantly by the introduction of at least one electron-withdrawing group (e.g., halogen, $NO_2$, COR, COOR, etc., where R is H, hydrocarbon, etc.) to the TAM-H or DAM-H aromatic structure. In this case, color formation is delayed allowing one to obtain colorless polymer at low doses, colorize the polymer at an intermediate dose and bleach the color by further irradiation.

DETAILED DESCRIPTION OF THE INVENTION

In accordance with the present invention, a composition which can be selectively colored by exposure to actinic radiation and a method leading to the formation of selectively colored, polymer bodies that can be cured photochemically are provided. The invention is particularly useful for the selective color development and photopolymerization of films using a leucobase color former and an oxidizing agent. The composition of the present invention can be used in a solid or a liquid.

Those skilled in the art will appreciate that the color determinative irradiation step can be conducted before, after or simultaneously with the polymerization or crosslinking step. Furthermore, selective coloration of a polymeric body in accordance with the present invention can be carried out using one exposure or light source to polymerize or crosslink the composition and a second exposure or light source to induce the photochromic response, or using a single light source to polymerize the composition at a first intensity and using the same light source at a plurality of intensities to induce the photochromic response. The latter system has the advantage that it involves the use of only one light source and it will be appreciated that this system is easily implemented using highly sensitive photohardenable systems, which can be easily polymerized using a lower intensity light exposure. As a general rule, agents, such as photoinitiators, used to initiate polymerization will be more efficient than the photoresponsive agents described below so more or different energy will be required to color or bleach the selectively colorable composition than to form the polymeric film or body and colorization or bleaching will be induced at higher intensities than polymerization.

The present invention involves the interaction of a leucobase color former and an oxidizing agent to generate a photosensitive selectively colorable composition. The color former yields a dye cation upon actinic exposure in the presence of an oxidizing agent via electron-transfer process. The The dye cation is then bleached upon further actinic exposure to yield colorless species. The rate of the initial oxidation process can be decreased and controlled by the introduction of at least one electron-withdrawing group (e.g., halogen, $N_2$, COR, COOR, etc., where R is H, hydrocarbon, etc.) to the TAM-H or DAM-H structure. In this case, color formation is delayed allowing one to obtain colorless polymer at low doses, colorize the polymer at an intermediate dose and bleach the color by further irradiation.

Examples of leucobases which yield a colored cation upon exposure to actinic radiation in the presence of an oxidizing agent include thiazine, oxazine and phenazine leucobases as well as triarylmethane leucobases (TAM-X), diarylmethane leucobases (DAM-X) and monoarylmethane leucobases (Ar—$CR_2X$) wherein X is H, OH, OR, $NR_2$, N-heterocycle, and R is hydrogen, a straight chain, branched chain or cyclic alkyl group containing 1 to 20 carbon atoms, aryl (e.g., phenyl) or aralkyl (e.g., a phenylalkyl group in which the alkyl moiety contains 1 to 6 carbon atoms) and the like. Preferably, the color former is a triarylmethane or diarylmethane leucobase susceptible to oxidation, with diarylmethane leucobase (DAM-H) being the most preferred color former. Color formers useful in the present invention are preferably stable in acidic media and do not form color on contact with acid. The term "stable in acidic media" as used herein indicates that the color former will not exhibit more that 0.005% conversion to its colored form in acidic conditions. Stability of the leucobase in acidic media allows it to be used in cationically cured materials for selective color formation.

Examples of triarylmethane leucobase color formers include tris(4-(N,N-dimethylamino) phenyl)methane (Leuco Crystal Violet), tris(4-aminophenyl)methane (Leuco Basic Fuchsin), bis(4-(N,N-dimethylamino)phenyl) pentafluorophenylmethane, bis(4-(N,N-dimethylamino) phenyl) -2-fluorophenylmethane, bis(4-(N,N-dimethylamino)phenyl)-3-fluorophenylmethane, bis(4-(N, N-dimethylamino)phenyl)-2,6-difluorophenylmethane, bis (3-(2-methylindyl))phenylmethane, and the like.

Examples of diarylmethane leucobase color formers include bis(4-aminophenyl)methane, bis(4-(N,N-dimethylamino)phenyl)methane, bis(4-amino-3,5-dimethylphenyl)methane, bis(4-amino-3-chlorophenyl) methane, bis(4-amino-2-chloro-3,5-diethylphenyl)methane, bis(4-aminophenyl)methane, 4-aminophenyl-(4-amino-3-bromophenyl)methane and the like.

Oxidizing agents useful in the present invention include compounds which are electron acceptors capable of oxidizing the leuco dye and generating the colored carbocation. Typical photosensitive oxidizing agents include onium salts such as iodonium, sulfonium and the like, transition metals, iron salts, uranyl salts, etc. used in the absence or presence of an oxidizing species such as hydrogen peroxide. The oxidizing agent, to oxidize the leuco dye, will have a photoreduction potential less than the color former.

Onium salts such as sulfonium or iodonium salts are particularly preferred for use as oxidizing agents in the invention. It is believed that upon photochemical or thermal decomposition, an iodonium salt generates radicals and cations, either or both of which can be used to initiate polymerization, while oxidizing the color precursor which converts the color precursor into its colored form.

Self-coloring photohardenable compositions in accordance with the present invention in their simplest form include a curable compound, an onium salt and a color precursor. In some cases, the compositions may,also include a hydrogen donor, although not essential in the principal embodiments, and for many applications it will also be desirable to include a photoinitiator in the composition.

While triarylsulfonium salts such as triarylsulfonium hexafluoroantimonate or mixtures of triarylsulfonium hexafluoroantimonates and the like are preferred onium salts, other sulfonium salts and iodonium salts are also suitable for use in the invention. Decomposition of triarylsulfonium hexafluoroantimonate can be achieved photochemically. Examples of onium salts useful in the present invention include iodonium salts and sulfonium salts and, more particularly, diaryliodonium hexaflurophosphates, diaryliodonium arsenates and diaryliodonium antimonates. The counter ion of the onium salts is usually a nonnucleophilic semimetal complex such as $B(C_6F_5)_4^-$, $Al(C_6F_5)_4^-$, $Ga(C_6F_5)_4^-$, $In(C_6F_5)_4^-$, $Th(C_6F_5)_4^-$, $SbF_6^-$, $AsF_6^-$, $PF_6^-$, and $BF_4^-$. A more complete list of iodonium salts appears in published International Application PCT/US/95/056 13. Representative examples of iodonium salts include salts having the following structures: $C_nH_{2n-1}C_6H_4I^+(C_6H_5)$, $(C_nH_{2n-1}C_6H_4)_2I^+$, $(C_nH_{2n+1}OC_6H_4)I^+(C_6H_5)$ and $(C_nH_{2n+1}OC_6H_4)_2I^+$ wherein is preferably 1 and typically 8 to 12 and most preferably, the diaryliodonium salts such as 4,4'-dimethyldiphenyliodonium tetrafluoroborate and (4-octyloxyphenyl) phenyliodonium hexafluoroantimonate (OPPI). Representative examples of sulfonium salts include triarylsulfonium hexafluoroantimonate, triarylsulfonium hexafluorophosphate, triarylsulfonium tetra(perfluoro) phenylgallate, tetra(perfluoro)phenylborate and the like. Examples of particularly preferred onium salts include 1.) OPPI and 2.) a mixture of triarylsulfonium hexafluoroantimonates (UVI-6974 from Union Carbide).

Because decomposition of the onium salt is accompanied by the generation of free radicals and cations, the curable material may be a free radical curable or a cation curable material or a blend of the two. There is a large number of monomers which can be polymerized by cations. These monomers can be classified according to their functionality. They include cyclic ethers, cyclic formals and acetals, vinyl ethers, and epoxy compounds. These monomers can be monofunctional, difunctional and multifunctional. They may also be large molecular weight prepolymers and oligomers. Examples of cationically polymerizable compounds include epoxy compounds, vinyl or allyl monomers, vinyl or allylic prepolymers, vinyl ethers, vinyl ether functional prepolymers, cyclic ethers, cyclic esters, cyclic sulfides, melamineformaldehyde prepolymers, phenol formaldehyde prepolymers, cyclic organosiloxanes, lactams and lactones, cyclic acetals and epoxy functional silicone oligomers.

Epoxy monomers are the most important class of cationic polymerizable substrates. These materials are readily available and the resulting cured polymers possess excellent dimensional and thermal stability as well as superior mechanical strength and chemical resistance. They are widely used in the coating, painting and adhesives industry. Examples of cationically polymerizable epoxy compounds described in the literature include any monomeric, dimeric or oligomeric or polymeric epoxy material containing one or a plurality of epoxy functional groups. Examples of polymerizable epoxy compounds include bisphenol-A-diglycidyl ether, trimethylene oxide, 1,3-dioxolane, 3,4-epoxycyclohexylmethyl-3',4'-epoxycyclohexyl carboxylate, phenyl glycidyl ether, 4-vinylcyclohexene dioxide, limonene dioxide, cycloaliphatic epoxides such as 1,2-cyclohexene oxide, epichlorohydrin, glycidyl acrylate, glycidyl methacrylate, styrene oxide, allyl glycidyl ether, etc. Resins which result from the reaction of bisphenol A (4,4-isopropylidenediphenol) and epichlorohydrin, or from the reaction of low molecular weight phenol-formaldehyde resins (Novolak resins) with epichlorohydrin have been used alone or in combination with an epoxy containing compound. In addition, polymerizable epoxy compounds include polymeric materials containing terminal or pendant epoxy groups. Examples of these compounds are vinyl copolymers containing glycidyl acrylate or methacrylate as one of the comonomers. Other classes of epoxy containing polymers amenable to cure have also been described in the literature and include epoxy-siloxane resins, epoxy-polyurethanes and epoxy-polyesters. Such polymers usually have epoxy functional groups at the ends of their chains. Epoxy-siloxane resins and the method for making them are more particularly shown by E. P. Plueddemann and G. Ganger, J. Am. Chem. Soc. 81 632–5 (1959), and in Crivello et al., Proceeding ACS, PMSE, 60, 217 (1989). As described in the literature, epoxy resins can also be modified in a number of standard ways such as reactions with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins are shown in the Encyclopedia of Polymer Science and Technology, Vol. 6, 1967, Interscience Publishers, New York, pp. 209–271.

Examples of vinyl or allyl organic monomers which have been used in the literature in the practice of the cationic polymerization include, for example, styrene, vinyl acetamide, methyl styrene, isobutyl vinyl ether, n-octyl vinylether, acrolein, 1-diphenylethylene. R-pinene; vinyl arenes such as 4-vinyl biphenyl, 1-vinyl pyrene, 2-vinyl fluorene, acenapthylene, 1 and 2-vinyl napthylene; 9-vinyl carbazole, vinyl pyrrolidone, 3-methyl-1-butene; vinyl cycloaliphatics such as vinylcyclohexane, vinylcyclopropane, 1-phenyvinylcyclopropane; dienes such as isobutylene, isoprene, butadiene, 1,4-pentadiene, 2-chloroethyl vinyl ether, etc. Some of the vinyl organic prepolymers which have been described are, for example, $CH_2=CH-O-(CH_2O)_n-CH=CH_2$, where n is a positive integer having a value up to about 1000 or higher; multi-functional vinylethers, such as 1,2,3-propane trivinyl ether, trimetheylolpropane trivinyl ether, polyethyleneglycol divinylether (PEGDVE), triethyleneglycol divinyl ether (TEGDVE), vinyl ether-polyurethane, vinyl ether-epoxy, vinyl ether-polyester, vinyl ether-polyether and other vinyl ether prepolymers such as 1,4-cyclohexane dimethanol-divinylether, commercially available from GAF and others, and low molecular weight polybutadiene having a viscosity of from 200 to 10,000 centipoises at 25° C., etc.

A further category of cationically polymerizable materials are cyclic ethers which are convertible to thermoplastics. Included by such cyclic ethers are, for example, oxetanes such as 3,3-bis-chloromethyloxetane alkoxyoxetanes as shown by U.S. Pat. No. 3,673,216; oxolanes such as tetrahydrofuran, oxepanes, oxygen containing spiro compounds, trioxane, dioxolane, etc. In addition to cyclic ethers, there are also included cyclic esters such as lactones, for example, propiolactone, cyclicamines, such as 1,3,3-trimethylazetidine and cyclic organosiloxanes, for example. Examples of cyclic organosiloxanes include hexamethyl trisiloxane, octamethyl tetrasiloxane, etc. Cyclic acetals may also be used as the cationic polymerizable material. Examples of epoxy functional silicone oligomers are commercially available from General Electric and are described in ACS PMSE Proceeding 1989, Vol. 60, pp. 217, 222.

Because the photoinitiator generates both free radicals and cations, it is possible to utilize a combination of free radical polymerizable and cationic polymerizable monomers. Examples of free radical polymerizable monomers include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol and the like, and acrylate or methacrylate terminated epoxy resins, acrylate or methacrylate terminated polyesters, etc. Representative examples include ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1, 6-dimethacrylate, and diethyleneglycol dimethacrylate.

Examples of materials which are both cationically and free radically cured include glycidyl methacrylates, epoxy acrylates, acrylated melamine formaldehyde and epoxidized siloxanes. The simultaneous utilization of a cationically and free radical curable system enables rapid curing to be accomplished and provides a wide latitude in the design of product performance. For example, when a solution of acrylate and epoxy acrylate is used as the dual curable composition, film properties ranging from flexible to rigid can be produced and desired adhesive characteristics can be produced by selection of designed ratios of functional groups. The epoxy functionality provides high temperature resistance, excellent adhesion and reduced oxygen sensitivity whereas the acrylate functionality provides rapid curing speed, excellent weatherability, flexibility and desirable viscosity. Other examples of dual curable systems will be envisioned and appreciated by those skilled in the art. It has been found that a mixture of an acrylate and an epoxy compound is particularly desirable for use herein.

In accordance with one embodiment of the present invention, a photoinitiator is included in the self coloring photohardenable composition. Some typical examples of photoinitiators which are expected to be useful in the present invention are α-alkoxy phenyl ketones, O-acylated-α-oximinoketones, polycyclic quinones, benzophenones and substituted benzophenones, xanthones, thioxanthones, halogenated compounds such as chlorosulfonyl and chloromethyl polynuclear aromatic compounds, chlorosulfonyl and chloromethyl heterocyclic compounds, chlorosulfonyl and chloromethyl benzophenones and fluorenones, haloalkanes, α-halo-α-phenylacetophenones, halogenated paraffins (e.g., brominated or chlorinated paraffin) and benzoin alkyl ethers. A wide range of xanthene or fluorone dyes may be used as photoinitiators in accordance with the invention. Some examples include Methylene Blue, rhodamine B, Rose Bengal, 3-hydroxy-2,4,5,7-tetraiodo-6-fluorone, 5,7-diiodo-3-butoxy-6-fluorone, erythrosin B, Eosin B, ethyl erythrosin, Acridine Orange, 6'-acetyl-4',5',6',7'-tetraiodofluorescein (RBAX), and the fluorones disclosed in U.S. Pat. No. 5,451,343.

For some applications it may be desirable to include a hydrogen donor in the compositions of the invention. Useful hydrogen donors can be selected from among those known in the art and, more particularly, from known hydrogen donating coinitiators. Non-nucleophilic amines such as aromatic amines of low basicity are particularly useful in the invention. The relative efficiency of the hydrogen donor in cationic polymerization not only depends on the efficiency of radical generation, but also on the efficiency of the oxidation of the radicals to cations as well as on the efficiency of the cation to initiate the cationic polymerization. The hydrogen donor must have a low basicity and low nucleophilicity. If the hydrogen donor is too basic, it will deactivate the cationic center responsible for initiation. Only aromatic amines with α hydrogens are capable of initiating ring opening polymerization of cyclohexene oxide. Aliphatic amines, aromatic amines without α-hydrogens and non-amine hydrogen donors are incapable of the initiation with cyclohexene oxide.

Representative examples of N,N-dialkylanilines useful in the present invention are 4-cyano-N,N-dimethylaniline, 4-acetyl-N,N-dimethylaniline, 4-bromo-N,N-dimethylaniline, 4-methyl-N,N-dimethylaniline, 4-ethoxy-N N-dimethylaniline, N,N-dimethylthioanicidine, 4-amino-N,N-dimethylaniline, 3-hydroxy-N,N-dimethylaniline, N,N,N'N'-tetramethyl-1,4-dianiline, 4-acetamido-N,N-dimethylaniline, 2,6-diethyl-N,N-dimethylaniline, N,N,2,4,6-pentamethylaniline(PMA) p-t-butyl -N,N-dimethylaniline and N,N-dimethyl-2,6-diisopropyl aniline. Also useful as hydrogen donors are N-phenylglycine and N,N-dimethyltoluidine. However, the invention is not limited to the use of amines or aromatic amines as hydrogen donors. Other compounds present in the composition may be capable of functioning as a hydrogen donor. For example, many monomers are capable of acting as hydrogen donors and compositions containing these compounds may be used effectively with or without amines. Specific examples of such monomers include certain cycloaliphatic epoxides.

Solvents may be necessary to dissolve components of the system including the photoinitiator, the color precursor, etc., if they are not sufficiently soluble in the monomer. Some examples of useful solvents are ethyl acetate, etc. Other useful solvents can be identified readily.

The nature of the monomer or polymerizable material, the amount of the color precursor and onium salt in curable self-coloring compositions in accordance with the present invention will vary with the particular use of the compositions, the emission characteristics of the exposure sources, the development procedures, the physical properties desired in the polymerized product and other factors. With this understanding, compositions in accordance with the invention will generally fall within the following compositional ranges in parts by weight (based on 100 parts total).

| Curable compound | 60 to 99 |
|---|---|
| Color Precursors | 0.001 to 1 |
| Photoinitiator | 0 to 10 |
| Onium Salt | 0.05 to 15 |

Compositions in accordance with the invention more typically are anticipated to have the following formulation:

| Curable compound(s) | 85 to 98 |
|---|---|
| Color Precursors | 0.02 to 0.2 |
| Photoinitiator | 0.5 to 7.0 |
| Onium Salt | 0.1 to 7.0 |

Preferably, the color formers are present in an amount sufficient to provide a contrast ratio of at least 1.5, more preferably at least 10, or provide a contrast ratio of less than 0.7 in the case of reversed contrast. The term "contrast ratio" means the ratio of absorbance maximum values at two doses. These doses are the largest dose and the dose at which the polymer is formed unless specified otherwise. As used herein contrast ratio refers to the absorbance of the colored polymeric film or body at the high irradiation dose divided by the absorbance at the low dose at the specified wavelength. Contrast ratio is a function of a number of variables including, but not limited to, the light source, irradiation dosage, curable compound, photoinitiator and color formers.

The number of color formers, type of color formers, the concentration of the color formers, the interaction between the different color formers and the relative concentrations of the color formers influence the contrast ratio.

The compositions of the present invention are useful in the following applications: creating color contrast in printing plates such as in flexographic plates, other proofing and identification purposes, end of line manufacturing identification, fraud protection, selective imagewise colorization of a wire or other plastic objects, color printing of relief and 3D images with various light sources, and the like. The photohardenable composition of the invention may also be advantageous for use in the three dimensional modeling process taught in U.S. Pat. No. 4,575,330 to Hull and commonly assigned U.S. Pat. No. 5,514,519, the latter being hereby incorporated by reference.

Irradiation of resins consisting of monomers, preferably acrylates or epoxides and most preferably a mixture of acrylates and epoxides, a leucobase color former and a sulfonium salt can result in selectively colored films in which the polymerization process and the color formation occur simultaneously. Alternatively, the polymerization process can be conducted prior to the color formation.

In a preferred embodiment of the present invention, a photopolymerizable composition comprising a cationically polymerizable epoxide, a triarylsulfonium salt photoinitiator, an acrylate and a free radical photoinitiator is polymerized in the presence of a diarylmethane leucobase color former (DAMH). Color formation proceeds according to the following mechanisms:

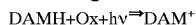                Mechanism 1

The color of the polymeric body at low doses is solely determined by $DAM^+$. At high doses this cation is partially or completely bleached (Mechanism 2), thus, the polymer body has no or little color.

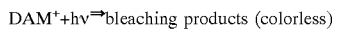        Mechanism 2

In another embodiment of the present invention, the oxidation process can alternatively be inhibited significantly by the introduction of at least one electron-withdrawing group (halogen, $NO_2$, COR, COOR, etc., where R is H or a hydrocarbon group) to the TAM-H or DAM-H, preferably DAM-H structure. In this case, the color formation is delayed allowing one to obtain colorless polymer at low doses, colorize it at higher doses and bleach the color at even higher doses.

Although the present invention has been primarily described by reference to polymerizable compositions, the invention is not so limited. The selectively colorable compositions can be liquids or solids which form color on exposure to actinic radiation and the color so formed can be bleached by further irradiation.

The present invention is further illustrated by the following, non-limiting examples:

EXAMPLE 1

A selectively colorable photocurable composition can be prepared by including 0.03% bis(4-aminophenyl)methane as a DAM-H color former in Resin 1, a hybrid resin containing cationically polymerizable epoxide(s) (60–90%), triarylsulfonium hexafluoroantimonate photoinitiator(s) (0.5–8%), acrylate esters (5–35%) and free radical initiator(s) (0.5–5.0%). The contrast ratio obtained is close to zero because the blue color is bleached away. The polymer colors are blue and slightly yellow.

EXAMPLE 2

A selectively colorable photocurable composition can be prepared by including 0.025% bis(4-amino-3-chlorophenyl) methane as a DAM-H color former with at least one electron-withdrawing group in its structure in Resin 2, a hybrid resin containing cationically polymerizable epoxides (s) (60–90%), triarylsulfonium hexafluoroantimonate photoinitiator(s) (2–10%), acrylate esters (5–25%), and free radical photoinitiators(s) (1–10%). The polymer colors are none (40 $mJ/cm^2$), green (400 $mJ/cm^2$) and yellowish (1 $J/cm^2$).

Experimental Procedure for Examples 1 and 2
Samples are prepared as follows:

A 200 micron thin layer is drawn down on a glass slide. It is scanned with a He/Cd (325 nm) laser (Example 1) or a NdYAG pulsed (354 nm) laser (Example 2) with a 1.5 mm diameter beam. The dose ranges from 30–1000 $mJ/cm^2$ with a typical maximum dose being 600 $mJ/cm^2$. A low dose of 30 to 80 $mJ/cm^2$ is employed to polymerize the composition. A contrast ratio is measured at the maximum absorption with the absorbance at the high dose being ratioed to the absorbance at the lowest dose at the specified wavelength.

EXAMPLE 3

A selectively colorable photocurable composition can be prepared by including 0.1% bis(4-aminophenyl)methane as a DAM-H color former in tetrahydrofuran (THF) solution containing 50wt % of low molecular weight polyvinylchloride (PVC) and 2–8% of a mixture of triarylsulfonium hexafluoroantimonates (UVI-6974). A 0.5 mm thin polymer film was cast on a glass slide as THF was evaporated. The sample turns blue when irradiated with an H-bulb high pressure mercury lamp at 100 $mJ/cm^2$. The blue color faded when the sample was subjected to 1000 $mJ/cm^2$ from the same light source.

Having described the invention in detail, it will be apparent that modifications and variations are possible without departing from the scope of the invention defined in the appended claims.

What is claimed is:

1. A composition which can be selectively colored by exposure to actinic radiation comprising an oxidizing agent and a leucobase color former selected from the group consisting of triarylmethane leucodyes, diarylmethane leucodyes and monoarylmethane leucodyes, said leucobase being substituted wit at least one electron-withdrawing group, wherein the color former yields a dye cation upon exposure in the presence of the oxidizing agent via electron transfer process and the dye cation can be bleached by further irradiation.

2. The composition of claim 1 wherein the oxidizing agent is a compound having a photoreduction potential less than said color former.

3. The composition of claim 2 wherein said oxidizing agent is an onium salt.

4. The composition of claim 3 wherein said onium salt is a sulfonium salt or an iodonium salt.

5. The composition of claim 4 wherein said sulfonium salt is a triarylsulfonium salt.

6. The composition of claim 1 wherein said color former is a diarylmethane leucobase.

7. The composition of claim 1 wherein said electron-withdrawing group is selected from the group consisting of halogen, $NO_2$, COR and COOR where R is H or hydrocarbon, wherein said electron-withdrawing group serves as an inhibitor of the color formation rate.

8. The composition of claim 7 wherein said leucobase is bis(4-amino-3-chlorophenyl)methane.

9. The composition of claim 1 wherein said composition is a solid or a liquid.

10. The composition of claim 1 wherein said composition is sensitive to light having a wavelength less than 375 nm.

11. The composition of claim 1 wherein said composition can be selectively colored by exposure to radiation of different intensity.

12. The composition of claim 1 wherein said composition is selectively colored by exposure to radiation of different wavelength.

13. The composition of claim 1 further comprising a curable compound.

14. The composition of claim 13 wherein said curable compound is selected from the group consisting of epoxides, cyclic formals, cyclic acetals, cyclic ethers, cyclic esters, cyclic sulfides, alkyl monomers, vinyl monomers, vinyl ether functional prepolymers, melamine-formaldehyde prepolymers, phenol-formaldehyde prepolymers, cyclic organosiloxanes, lactams, lactones, epoxy functional silicone oligomers, acrylates, methacrylates, vinyl ethers and mixtures thereof.

15. The composition of claim 14 wherein said curable compound is a mixture of an epoxide and one or more acrylates.

16. A method comprising the steps of:
   a. providing a composition which comprises a color former which yields a dye cation upon exposure in the presence of an oxidizing agent;
   b. selectively exposing the composition to a low dosage of actinic radiation thereby forming a color in the composition area; and
   c. selectively exposing the composition to a higher dosage of actinic radiation thereby bleaching all or a portion of the color formed in step b.

17. The method of claim 16 wherein said color former comprises a leucobase substituted with at least one electron-withdrawing group.

18. A method comprising the steps of:
   a. providing a composition which comprises a leucobase color former which yields a dye cation upon exposure in the presence of an oxidizing agent;
   b. selectively exposing the composition to a low dosage of actinic radiation thereby forming a colorless area;
   c. selectively exposing the composition to an intermediate dosage of actinic radiation thereby forming a color; and
   d. selectively exposing the composition to a higher dosage of actinic radiation thereby bleaching all or a portion of the color formed in step c.

19. The method of claim 18 wherein said leucobase color former is substituted with at least one electron-withdrawing group.

20. The method of claim 18 wherein said radiation is accomplished using at least one laser.

21. The method of claim 20 wherein said laser is a He/Cd (325 nm) laser or NdYAG (354 nm) laser.

* * * * *

UNITED STATES PATENT AND TRADEMARK OFFICE
CERTIFICATE OF CORRECTION

PATENT NO. : 6,344,035 B1
DATED : August 13, 2002
INVENTOR(S) : Oleg V. Grinevich et al.

It is certified that error appears in the above-identified patent and that said Letters Patent is hereby corrected as shown below:

<u>Title page,</u>
Item [54], Title, the word "POLYMERIZABLE" should be deleted from the title.

<u>Column 10,</u>
Line 21, change the word "wit" to -- with --;

<u>Column 11,</u>
Line 7, after the word "position", delete the word "area".

Signed and Sealed this

Twelfth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,433,035 B1
DATED         : August 13, 2002
INVENTOR(S)   : Oleg V. Grinevich et al.

It is certified that error appears in the above-identified patent and that said Letters Patent is hereby corrected as shown below:

<u>Title page,</u>
Item [54], Title, the word "POLYMERIZABLE" should be deleted from the title.

<u>Column 10,</u>
Line 21, change the word "wit" to -- with --;

<u>Column 11,</u>
Line 7, after the word "position", delete the word "area".

Signed and Sealed this

Seventeenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,433,035 B1
DATED         : August 13, 2002
INVENTOR(S)   : Oleg V. Grinevich et al.

It is certified that error appears in the above-identified patent and that said Letters Patent is hereby corrected as shown below:

<u>Title page,</u>
Item [54], Title, the word "POLYMERIZABLE" (as deleted by Certificate of Correction issued November 12, 2002 and December 17, 2002) should be reinstated.

Signed and Sealed this

First Day of April, 2003

JAMES E. ROGAN
*Director of the United States Patent and Trademark Office*